(12) United States Patent
Kondoh et al.

(10) Patent No.: US 12,292,092 B2
(45) Date of Patent: May 6, 2025

(54) SHIM FOR DISK BRAKES, AND DISK BRAKE

(71) Applicant: NICHIAS CORPORATION, Tokyo (JP)

(72) Inventors: Junichi Kondoh, Tokyo (JP); Toshiharu Anegawa, Tokyo (JP); Yuki Soeda, Tokyo (JP); Tadashi Arai, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 521 days.

(21) Appl. No.: 17/619,519

(22) PCT Filed: Jun. 16, 2020

(86) PCT No.: PCT/JP2020/023624
§ 371 (c)(1),
(2) Date: Dec. 15, 2021

(87) PCT Pub. No.: WO2020/255969
PCT Pub. Date: Dec. 24, 2020

(65) Prior Publication Data
US 2022/0389980 A1    Dec. 8, 2022

(30) Foreign Application Priority Data
Jun. 17, 2019    (JP) ................. 2019-112079

(51) Int. Cl.
*F16D 65/097*    (2006.01)
*B32B 5/20*    (2006.01)
*B32B 7/12*    (2006.01)
*B32B 15/04*    (2006.01)
*B32B 15/18*    (2006.01)
(Continued)

(52) U.S. Cl.
CPC ............ *F16D 65/0971* (2013.01); *B32B 5/20* (2013.01); *B32B 15/043* (2013.01);
(Continued)

(58) Field of Classification Search
CPC ............. F16D 65/0971; F16D 65/0006; F16D 2200/0056; F16D 2250/0069; B32B 5/20;
(Continued)

(56) References Cited

U.S. PATENT DOCUMENTS 3,918,555 A * 11/1975 Rath .................. F16D 65/0006
188/205 A
5,762,166 A * 6/1998 Yano .................. F16D 65/0006
188/264 G
(Continued)

FOREIGN PATENT DOCUMENTS

JP    2-117439    9/1990
JP    2002-295548    10/2002
(Continued)

OTHER PUBLICATIONS

Japanese Patent No. JP H0771519 to Yano et al published on Mar. 17, 1995.*
(Continued)

*Primary Examiner* — Pamela Rodriguez
(74) *Attorney, Agent, or Firm* — Nixon & Vanderhye P.C.

(57) ABSTRACT

A novel disc brake shim and a disc brake that can effectively suppress vibration and squeal are provided. The disc brake shim that is formed of a multilayer structure with three layers or more including at least a base material layer formed of a metal sheet, and a foamed rubber layer that is laminated on a main surface on one side of the base material layer, wherein the foamed rubber layer is an intermediate layer of the multilayer structure, and the disc brake including pad materials on both sides in an axial direction of a disc rotor, and shims on opposite sides from the disc rotor, of the pad materials adjacently, wherein each of the shims is the disc brake shim according to the present invention.

6 Claims, 6 Drawing Sheets

(51) Int. Cl.
  *B32B 25/00* (2006.01)
  *B32B 27/06* (2006.01)
  *B32B 27/30* (2006.01)
  *B32B 27/40* (2006.01)
  *F16D 65/00* (2006.01)

(52) U.S. Cl.
  CPC ............ *B32B 15/046* (2013.01); *B32B 15/18* (2013.01); *F16D 65/0006* (2013.01); *B32B 7/12* (2013.01); *B32B 25/00* (2013.01); *B32B 27/065* (2013.01); *B32B 27/308* (2013.01); *B32B 27/40* (2013.01); *B32B 2266/0207* (2013.01); *B32B 2307/732* (2013.01); *B32B 2605/00* (2013.01); *F16D 2200/0056* (2013.01); *F16D 2250/0069* (2013.01)

(58) Field of Classification Search
  CPC ..... B32B 15/046; B32B 15/043; B32B 15/18; B32B 7/12; B32B 25/00; B32B 27/065; B32B 27/308; B32B 27/40; B32B 2266/0207; B32B 2307/732; B32B 2605/00
  See application file for complete search history.

(56) References Cited

U.S. PATENT DOCUMENTS

| | | | |
|---|---|---|---|
| 2002/0189910 A1* | 12/2002 | Yano | B32B 15/043 188/264 G |
| 2004/0188190 A1* | 9/2004 | Niwa | F16D 65/0971 188/73.37 |
| 2004/0222055 A1* | 11/2004 | Niwa | F16D 65/0971 188/250 E |
| 2018/0283479 A1* | 10/2018 | Tamaoki | F16D 65/0006 |

FOREIGN PATENT DOCUMENTS

| | | |
|---|---|---|
| JP | 2005-315418 A | 11/2005 |
| JP | 2010-31960 | 2/2010 |
| JP | 2018-165555 | 10/2018 |
| KR | 10-0430514 B1 | 4/2004 |

OTHER PUBLICATIONS

Translation of the Description of Japanese Patent No. JP 2005-315418 obtained from website: https://worldwide.espacenet.com on Feb. 27, 2024.*

Translation of the Claims of Japanese Patent No. JP 2005-315418 obtained from website: https://worldwide.espacenet.com on Feb. 27, 2024.*

International Search Report for PCT/JP2020/023624 dated Jul. 14, 2020, 5 pages.

Written Opinion of the ISA for PCT/JP2020/023624 dated Jul. 14, 2020, 3 pages.

Office Action dated May 18, 2022 issued in Indian Application No. 202117055675 (6 pages).

Office Action dated Jan. 12, 2024 issued in Chinese Application No. 202080044007.7 with English translation (14 pages).

* cited by examiner

[Figure 1]
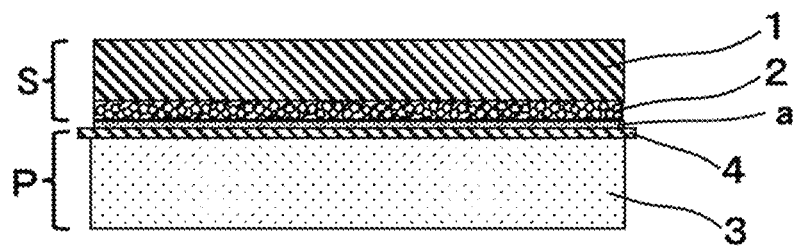
[Figure 2]
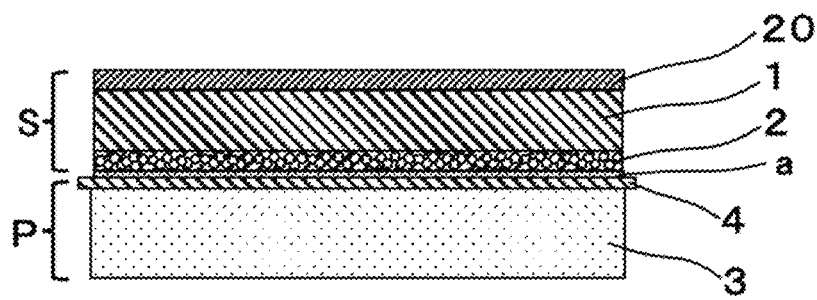
[Figure 3]
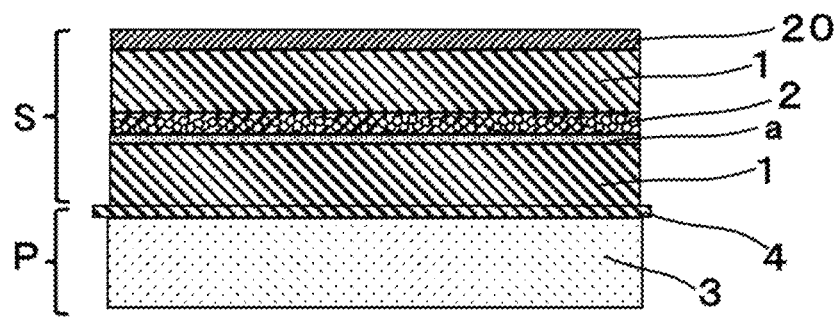

[Figure 4]
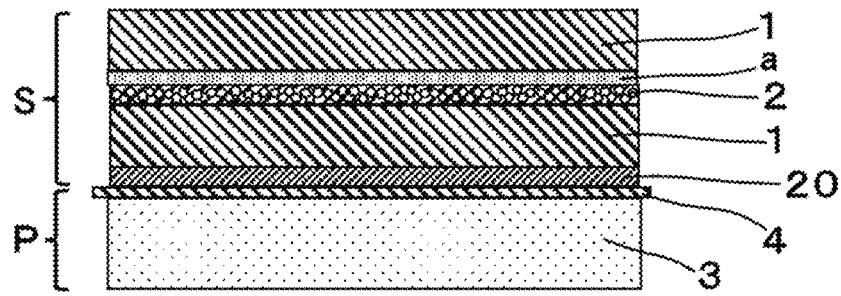
[Figure 5]
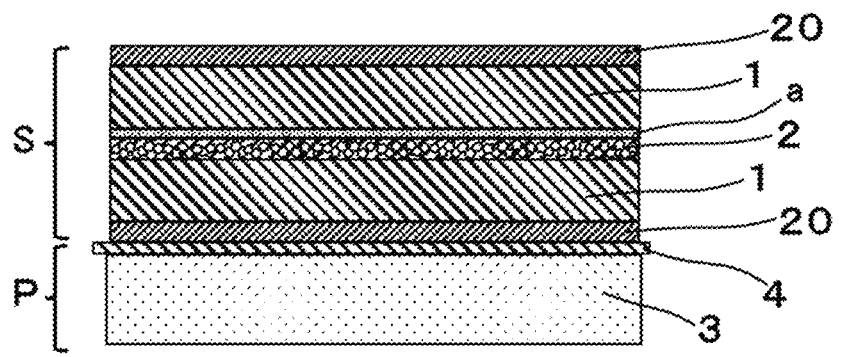
[Figure 6]
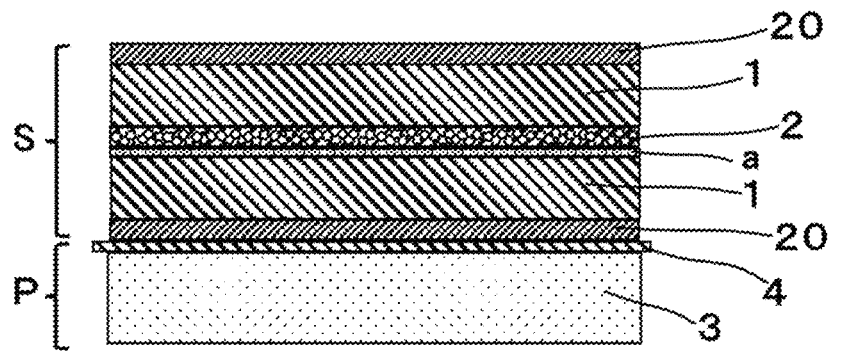

[Figure 7]
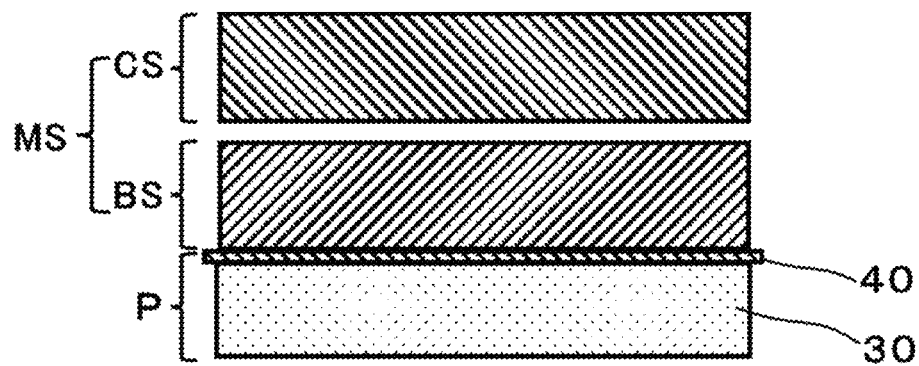
[Figure 8]
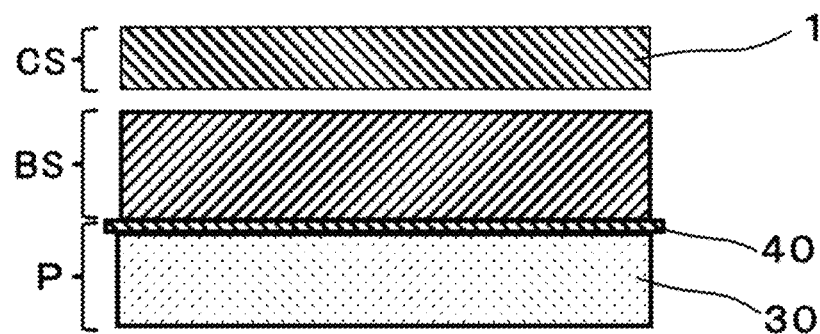
[Figure 9]
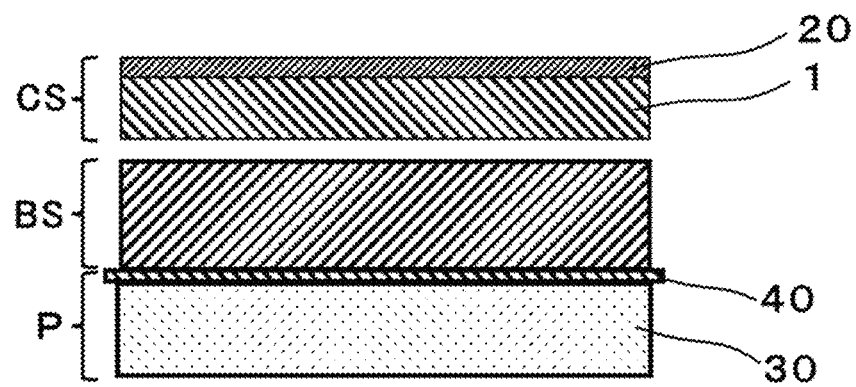

[Figure 10]
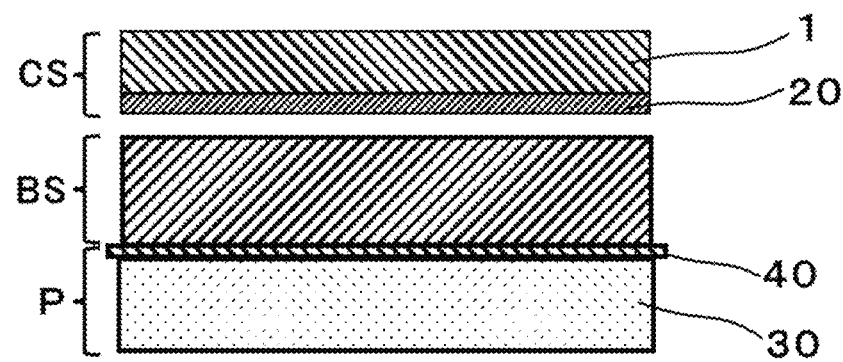
[Figure 11]
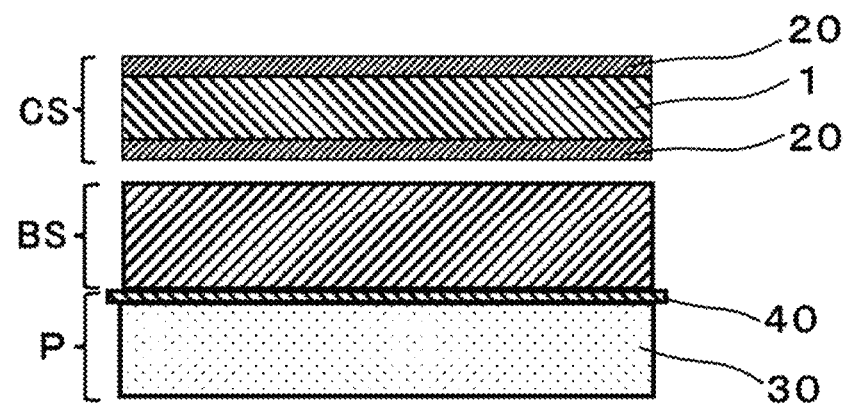

[Figure 12]
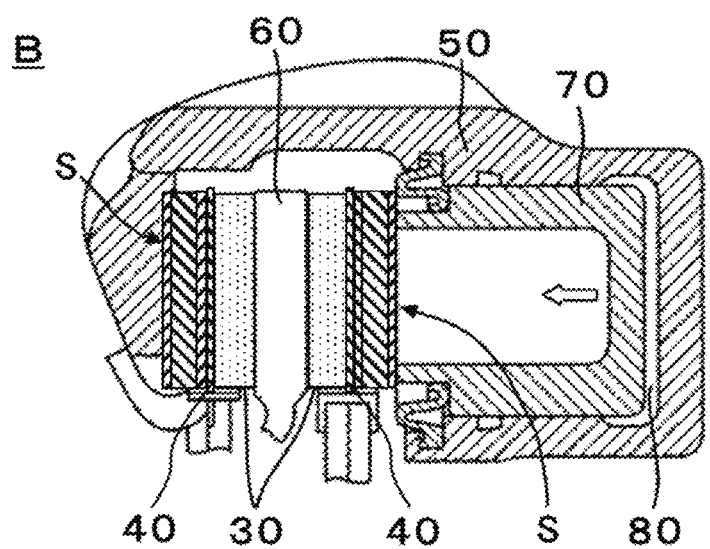
[Figure 13]
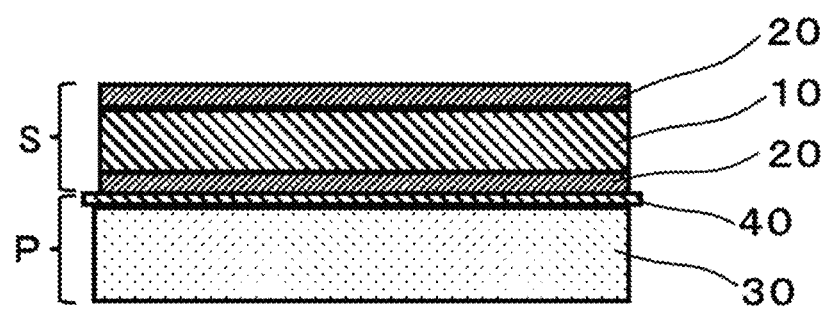

[Figure 14]
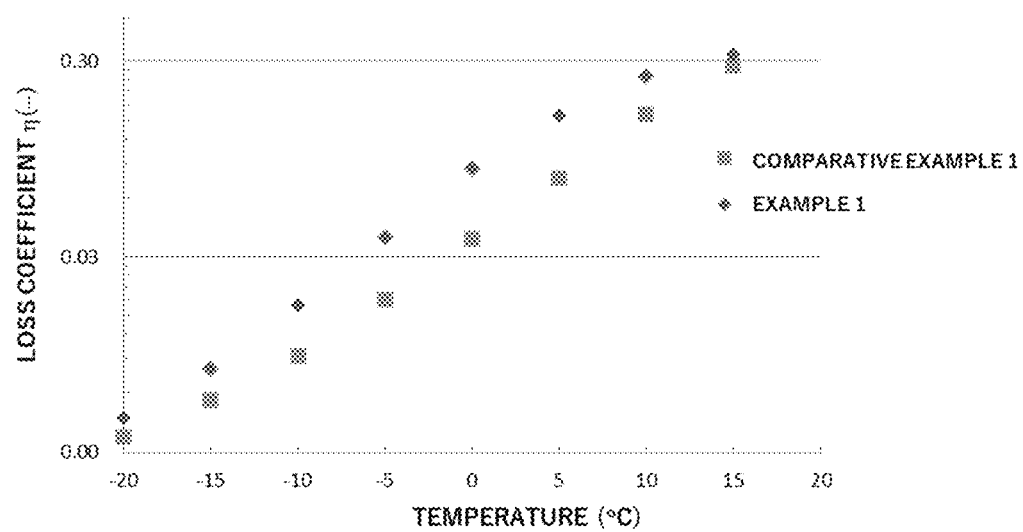

SHIM FOR DISK BRAKES, AND DISK BRAKE

This application is the U.S. national phase of International Application No. PCT/JP2020/023624 filed Jun. 16, 2020 which designated the U.S. and claims priority to JP Patent Application No. 2019-112079 filed Jun. 17, 2019, the entire contents of each of which are hereby incorporated by reference.

TECHNICAL FIELD

The present invention relates to a disc brake shim and a disc brake.

BACKGROUND ART

In general, disc brakes are widely used in automobiles and the like (refer to Patent Literature 1 (Japanese Patent Laid-Open No. 2010-31960), for example).

FIG. 12 is a vertical sectional view in one exemplary mode of a disc brake. As illustrated in FIG. 12, a disc brake B is structured such that it applies brakes by pressing brake pads 30 and 30 that are arranged on both sides in an axial direction of a disc rotor 60 that rotates integrally with a wheel, with a pressing member 70 formed of a piston and the like by hydraulic pressure of a brake oil 80 in a caliper 50, and pressing the brake pads 30 and 30 from both sides of the disc rotor 60.

If the brake pad 30 is directly pressed to the disc rotor 60 by the pressing member 70 during braking as described above, a back metal 40 of the brake pad and the pressing member 70 relatively move, and each part of the brake vibrates due to frictional vibration or the like that is generated between the brake pad 30 and the disc rotor 60, so that abnormal noise commonly referred to as squeal may occur.

CITATION LIST

Patent Literature

[Patent Literature 1] Japanese Patent Laid-Open No. 2010-31960

SUMMARY OF INVENTION

Technical Problem

In order to prevent occurrence of such squeal, a shim S is interposed between a pad material P formed of the brake pad 30 and the back metal 40, and the pressing member 70, as illustrated in FIG. 12 and FIG. 13. As the shim S, a rubber coat metal (RCM) with thin rubber layers 20 and 20 fixed onto surfaces of a metal sheet 10 that is formed of a joined material in which a stainless steel sheet and an iron sheet are bonded together as illustrated in FIG. 12 and FIG. 13, and it is considered that according to such a shim S, the vibration that is the cause of squeal can be dampened by using elasticity of the rubber layer 20 during a braking time by pressing by the pressing member 70.

However, according to the study by the present inventors, even the shim formed of the above described rubber-coated metal (RCM) cannot always sufficiently satisfy the needs of automobile users for comfort and quietness during driving, which have been increasing more and more in recent years, and therefore, there has been a demand for disc brake shims that can even more suppress vibration and squeal.

Accordingly, an object of the present invention is to provide a novel disc brake shim and disc brake that can effectively suppress vibration and squeal.

Solution to Problem

As a result of earnest study conducted by the present inventors attain the above described object, the present inventors has found that the above described technical problem can be solved by a disc brake shim that is formed of a multilayer structure with three layers or more having at least a base material layer formed of a metal sheet, and a foamed rubber layer that is laminated on a main surface on one side of the base material layer, wherein the foamed rubber layer is an intermediate layer of the multilayer structure, and have completed the present invention based on the present findings.

In other words, the present invention provides (1) a disc brake shim that is formed of a multilayer structure with three layers or more including at least a base material layer formed of a metal sheet, and a foamed rubber layer that is laminated on a main surface on one side of the base material layer, wherein the foamed rubber layer is an intermediate layer of the multilayer structure, (2) the disc brake shim as set forth in (1) described above, wherein the foamed rubber layer is a foam of an unfoamed rubber layer having a thickness of 15 to 100 μm with an expansion ratio of 2 to 4 times, (3) the disc brake shim as set forth in (1) or (2) described above, wherein the foamed rubber layer is a foam of an unfoamed rubber layer containing 20 to 70% by mass of polymer with a Mooney value of 10 to 70, and 20 to 60% by mass of a heat-decomposable chemical foaming agent, (4) the disc brake shim as set forth in any one of (1) to (3) described above, wherein the disc brake shim is a base shim or a cover shim in a laminated shim in which the cover shim is laminated on the base shim, and (5) a disc brake including pad materials on both sides in an axial direction of a disc rotor, and shims on opposite sides from the disc rotor, of the pad materials adjacently, wherein each of the shims is the disc brake shim as set forth in any one of (1) to (4) described above.

Advantageous Effect of Invention

According to the present invention, it is considered that not only the foamed rubber layer provided on the base material layer hardly transmits vibration of the brake pads and the like because the foamed rubber layer has a low density with a foamed part, but also the foamed rubber layer deforms to follow the vibration of the brake pads and the like to easily convert the vibration into thermal energy because the foamed rubber layer has flexibility, and the foamed rubber layer can easily convert vibration of an external member into frictional heat because the foamed rubber layer further has a high friction coefficient.

Consequently, according to the present invention, it is possible to provide a novel disc brake system and disc brake that can effectively suppress vibration and squeal.

BRIEF DESCRIPTION OF DRAWINGS

FIG. 1 is a vertical sectional view showing an exemplary mode of a disc brake shim according to the present invention.

FIG. 2 is a vertical sectional view showing an exemplary mode of the disc brake shim according to the present invention.

FIG. 3 is a vertical sectional view showing an exemplary mode of the disc brake shim according to the present invention.

FIG. 4 is a vertical sectional view showing an exemplary mode of the disc brake shim according to the present invention.

FIG. 5 is a vertical sectional view showing an exemplary mode of the disc brake shim according to the present invention.

FIG. 6 is a vertical sectional view showing an exemplary mode of the disc brake shim according to the present invention.

FIG. 7 is a vertical sectional view showing an exemplary mode of use of the disc brake shim according to the present invention.

FIG. 8 is a vertical sectional view showing an exemplary mode of use of the disc brake shim according to the present invention.

FIG. 9 is a vertical sectional view showing an exemplary mode of use of the disc brake shim according to the present invention.

FIG. 10 is a vertical sectional view showing an exemplary mode of use of the disc brake shim according to the present invention.

FIG. 11 is a vertical sectional view showing an exemplary mode of use of the disc brake shim according to the present invention.

FIG. 12 is a vertical sectional view showing a schematic structure example of a disc brake.

FIG. 13 is a vertical sectional view showing an exemplary mode of use of a disc brake shim that is an object to be compared.

FIG. 14 is a diagram showing vibration dampening property evaluation in an example and a comparative example of the present invention.

DESCRIPTION OF EMBODIMENTS

A disc brake shim according to the present invention is formed of a multilayer structure with three layers or more having at least a base material layer formed of a metal sheet, and a foamed rubber layer that is laminated and disposed on a main surface on one side of the base material layer, wherein the foamed rubber layer is disposed as an intermediate layer of the multilayer structure.

In the present application documents, the disc brake shim means the one in a state in which respective adjacent layers forming the disc brake shim are chemically or physically fixed.

In the disc brake shim according to the present invention, the metal sheet forming the base material layer is not particularly limited, but it is possible to cite sheet materials formed of a stainless steel (ferritic, martensitic, austenitic, and the like), iron, a plating material, aluminum and the like, and a sheet material formed of a stainless steel or iron is preferable.

In the disc brake shim according to the present invention, the metal sheet forming the base material layer may be formed by joining a plurality of metal sheets by pasting or the like, and as the metal sheet, a joined sheet of a stainless steel sheet and an iron sheet is preferable.

In the disc brake shim according to the present invention, a thickness of the metal sheet forming the base material layer is not particularly limited, but is normally 0.4 to 0.8 mm.

In the disc brake shim according to the present invention, the foamed rubber layer is preferably a foam of an unfoamed rubber layer.

The foamed rubber layer is preferably a foam of an unfoamed rubber layer of a thickness of 15 to 100 μm, more preferably a foam of an unfoamed rubber layer of a thickness of 30 to 70 μm, and is even more preferably a foam of an unfoamed rubber layer of a thickness of 40 to 60 μm.

A thickness of the above described unfoamed rubber layer means an arithmetic mean value when thicknesses at ten spots are measured by using a dial gauge.

In the disc brake shim according to the present invention, the thickness of the unfoamed rubber layer is within the above described range, so that the foamed rubber layer having a desired thickness can be easily formed.

As the foamed rubber layer, an expansion ratio of an unfoamed rubber layer is not particularly limited, but the foamed rubber layer is preferably a foam that is 2 to 4 times as large as the unfoamed rubber layer.

In the present application documents, the above described expansion ratio means a value that is calculated by an expression below.

$$\text{Expansion ratio} = \text{foamed rubber layer thickness/unfoamed rubber layer thickness}$$

(Note that the thickness of the foamed rubber layer means the arithmetic mean value when the thicknesses at 10 spots are measured by using a dial gauge, and the thickness of the unfoamed rubber layer also means an arithmetic mean value when thicknesses at 10 spots are measured by using a dial gauge.)

In the disc brake shim according to the present invention, the expansion ratio of the unfoamed rubber layer is within the above described range, so that the foamed rubber layer having a desired thickness can be easily formed.

The thickness of the foamed rubber layer is preferably 30 to 200 μm, more preferably 60 to 140 μm, and even more preferably 80 to 120 μm.

Since the thickness of the foamed rubber layer is within the above described range, it is possible to easily provide the disc brake shim having a desired density, and having a desired flexibility and friction coefficient.

A rubber composition forming the foamed rubber layer preferably contains a polymer (rubber component) having a Mooney value of 10 to 70, and more preferably contains a polymer having a Mooney value of 20 to 60.

In the present application documents, the Mooney value means a value that is measured by a method specified in JIS K6300-1 by using Mooney Viscometer SMV-201 made by Shimadzu Corporation.

When the Mooney value of the polymer is less than 10, deformation of the polymer by blowing gas easily increases, and when the Mooney value is more than 70 on the contrary, deformation of the polymer by blowing gas easily becomes insufficient.

As the polymer, it is possible to cite one or more selected from nitrile rubber (NBR), hydrogenated nitrile rubber (HNBR), fluororubber, ethylene propylene diene rubber (EPDM), acrylic rubber and the like, and one or more selected from nitrile rubber (NBR), hydrogenated nitrile rubber (HNBR), and fluororubber is preferable.

Furthermore, as the above described nitrile rubber (NBR), in order to give oil resistance, a nitrile rubber with an AN value (content of acrylonitrile group in NBR) of 39 to 52 is preferable, and a nitrile rubber with an AN value of 40 to 48 is more preferable.

Since the unfoamed robber layer contains the above described polymer, it is possible to easily obtain a foamed rubber layer having desired properties.

The unfoamed rubber layer preferably contains 10 to 70% by mass of the above described polymer, more preferably 20 to 60% by mass of the above described polymer, and even more preferably 30 to 50% by mass of the above described polymer.

The unfoamed rubber layer contains the above described polymer in the above described ratio, and thereby it is possible to effectively suppress sagging of the foamed rubber layer due to compression during braking.

When the foamed rubber layer is a foam of an unfoamed rubber layer, such an unfoamed rubber layer preferably contains a heat-decomposable chemical foaming agent.

As the heat-decomposable foaming agent, a heat-decomposable foaming agent with a foaming temperature of 120° C. or higher is preferable, and a heat-decomposable foaming agent with a foaming temperature of 150 to 210° C. is more preferable.

As a heat-decomposable foaming agent, it is possible to cite one or more selected from, for example, an azodicarbonamide foaming agent, dinitrosopentamethylene tetramine foaming agent, oxybisbenzenesulfonylhydrazide foaming agent, sodium bicarbonate foaming agent and the like.

The unfoamed rubber layer preferably contains 10 to 60% by mass of the above described heat-decomposable chemical foaming agent, and more preferably contains 15 to 35% by mass of the above described heat-decomposable chemical foaming agent.

The unfoamed rubber layer contains the above described heat-decomposable chemical foaming agent in the above described ratio, and thereby it is possible to easily form the foamed rubber layer having a desired density, and having a desired flexibility and friction coefficient.

Furthermore, the unfoamed rubber layer may contain a vulcanizing agent and a vulcanization accelerator. The vulcanizing agent is preferably contained in a large amount so as to increase a vulcanization density, and in the case of sulfur vulcanization, a sulfur compound amount is preferably 1.5 to 4.5 g (1.5 to 4.5 phr (parts per hundred rubber)) for 100 gram of polymer that is a rubber component.

Furthermore, as the vulcanization accelerator, it is preferable to use a high-speed vulcanization accelerator that rises with a time to T50 within 4 minutes according to curast data (150° C.). Note that the time to T50 according to the curast data (150°) means a time required until a vulcanization degree of rubber reaches T50 (elapsed time until reaching 50% of maximum torque) when vulcanization is performed at 150° C. by using a curast testing machine (JSR curast meter III made by Nichigo Shoji Co., Ltd.).

The foamed rubber layer preferably has a continuous foam rate of 60% or more, and more preferably has a continuous foam rate of 80% or more.

In the present application documents, the continuous foam rate means a value that is calculated by an expression below.

Note that "replaced water weight (g)" shown below means a value calculated by weight (g) after underwater replacement–weight (g) before underwater replacement treatment when treatment of immersing the disc brake shim having the above described foamed layer according to the present invention in water and thereafter performing vacuum-deaeration of the disc brake shim is repeated a plurality of times until the weight after underwater replacement becomes constant.

Furthermore, "volume of the foamed rubber layer" shown below means a value obtained from a product of a foamed rubber layer thickness obtained from an arithmetic mean value of thickness at 10 spots by using a dial gauge, and a surface area.

Furthermore, "volume of the unfoamed rubber layer" also means a value obtained from a product of an unfoamed rubber layer thickness obtained from an arithmetic mean value of the thicknesses at 10 spots by using a dial gauge, and a surface area.

Continuous foam rate (%)={replaced water weight (g)/(foamed rubber layer volume (cm$^3$)–volume of rubber layer before foaming) (cm$^3$)}×100

The continuous foam rate is within the above described range, and thereby it is possible to easily obtain a foamed rubber layer having a desired density, and having a desired flexibility and friction coefficient.

In the disc brake shim according to the present invention, it is possible to form the foamed rubber layer by, for example, dissolving a rubber compound containing respective desired amounts of polymer and a heat-decomposable chemical foaming agent in an organic solvent to prepare a coating liquid, applying the coating liquid to a metal sheet to be the base material layer, and fixing the coating liquid.

The above described organic solvent is not limited as long as it can dissolve the above described rubber compound, but it is preferable to use an organic solvent prepared by mixing an ester solvent in a ratio of 10 to 90% by mass with respect to 10 to 90% by mass of aromatic hydrocarbon solvent (ketone type is also possible) such as toluene. Furthermore, as the coating liquid, a coating liquid that is prepared by dissolving the above described rubber compound in the above described organic solvent so that the solid content concentration is 10 to 60% by mass is preferable.

A coating method of the coating liquid containing the rubber compound is not particularly limited, but the coating liquid is preferably coated by a skimmer coater, a roll coater or the like that can control a coating thickness.

After the coating liquid is applied, thermal treatment is preferably performed at 150 to 260° C. for 5 to 15 minutes to foam the foaming agent, and a foamed rubber layer is fixed while being formed. At this time, foaming conditions such as a vulcanizing agent and the foaming agent to be used, a heating time and the like are adjusted so that the expansion ratio and the continuous foam rate of the foamed rubber layer to be obtained have desired values.

The expansion ratio can be easily controlled by adjusting types and compound ratios of the polymer having the above described Mooney value, and the vulcanizing agent and the foaming agent described above, and can be easily controlled in particular by adjusting the Mooney value and a vulcanizing rate of the polymer.

When the vulcanizing rate is increased, vulcanization advances before the polymer expands and deforms by blowing gas, and therefore, the expansion rate is easily suppressed. When the vulcanizing rate is decreased on the contrary, deformation of the polymer by blowing gas takes precedence over a rubber curing rate by vulcanization, and therefore the expansion ratio easily increases.

For example, when a polymer with a Mooney value of 20 to 40, a vulcanization accelerator at a low rate (curast data: a rising time to T50 in vulcanization at 150° C. is around 5 to 6 minutes), and a foaming agent with a low foam decomposition temperature are combined, the expansion ratio increases, and when a polymer with a Mooney value of 40 to 60, a vulcanization accelerator with a high vulcanization rate (curast data: a rising time to T50 in vulcanization at 150° C. is around 1 to 3 minutes), and a foaming agent with a high foam decomposition temperature are combined on the contrary, the expansion ratio is easily decreased.

In this way, by combination of the polymer, vulcanization accelerator and foaming agent, it is possible to arbitrarily control the expansion ratio.

The disc brake shim according to the present invention is formed of a multilayer structure with three layers or more having at least a base material layer formed of a metal sheet, and a foamed rubber layer that is laminated and disposed on a main surface on one side of the base material layer, wherein the foamed rubber layer is disposed as an intermediate layer of the multilayer structure.

The disc brake shim according to the present invention is formed of a multilayer structure with three layers or more, wherein the foamed rubber layer is disposed as an intermediate layer. Here, the intermediate layer means a layer that is located on any one of locations on an inner side except for outermost layers, among a plurality of constituent layers that are three layers or more.

The disc brake shim according to the present invention may have an adhesive layer, in addition to the base material layer formed of a metal sheet, and the foamed rubber layer that is laminated and disposed on the main surface on one side of the base material layer.

As an adhesive forming the adhesive layer, it is possible to cite one or more selected from an acrylic adhesive, silicon adhesive, rubber adhesive, urethane adhesive and the like, and one or more selected from an acrylic adhesive and silicon adhesive is more preferable.

When the adhesive is an acrylic adhesive, one or more selected from a metal chelate crosslinking agent, isocyanate crosslinking agent, epoxy crosslinking agent and the like is preferably further used as a crosslinking agent.

The disc brake shim according to the present invention has the adhesive layer, and thereby can produce an excellent ability to prevent squeal by an excellent vibration control effect of the adhesive.

FIG. 1 is a vertical sectional view showing an exemplary mode of a disc brake shim according to the present invention having an adhesive layer.

FIG. 1 is a vertical sectional view showing the exemplary mode of a disc brake shim S that is formed of a multilayer structure with a three layers having a base material layer 1 formed of a metal sheet, a foamed rubber layer 2 that is laminated on a main surface on one side of the base material layer, and an adhesive layer "a" that is laminated on a main surface on an opposite side from the base material layer 1, of the foamed rubber layer 2, and as shown in FIG. 1, the disc brake shim S according to the present exemplary mode has the base material layer 1 and the adhesive layer "a" as outermost layers, and has the foamed rubber layer 2 as an intermediate layer between the base material layer 1 and the adhesive layer "a".

In the present exemplary mode, in a braking time, the disc brake shim S is pressed (in a lower direction from an upper side in FIG. 1) by a pressing member such as a piston that is provided in a caliper, and it is considered that not only the foamed rubber layer 2 forming the disc brake shim S hardly transmits vibration of the brake pad 3 and the like because the foamed rubber layer 2 has a low density with a foamed part, but also the foamed rubber layer 2 deforms to follow the vibration of the brake pad 3 and the like to easily convert the vibration into thermal energy because the foamed rubber layer 2 has flexibility.

Consequently, according to the disc brake shim according to the present invention shown in FIG. 1, it is possible to effectively suppress vibration and squeal.

The disc brake shim according to the present invention may have a solid rubber layer, in addition to the base material layer formed of a metal sheet, and the foamed rubber layer that is laminated and disposed on the main surface on one side of the base material layer.

In the present application documents, the solid rubber layer means a rubber layer that is formed without going through a foaming step by a foaming agent and has no air bubbles (derived from a foaming agent).

A thickness of the solid rubber layer is preferably 25 to 250 μm, more preferably 50 to 200 μm, and even more preferably 100 to 180 μm.

The thickness of the above described solid rubber layer means an arithmetic mean value at a time of measuring thicknesses at 10 spots by using a dial gauge.

As a polymer (rubber component) forming the solid rubber layer, one or more selected from nitrile rubber (NBR), hydrogenated nitrile rubber (HNBR), fluororubber, ethylene propylene diene rubber (EPDM) and acrylic rubber, and the like, and one or more selected from nitrile rubber (NBR), hydrogenated nitrile rubber (HNBR), and fluororubber is preferable.

Furthermore, as the above described nitrile rubber (NBR), in order to give oil resistance, a nitrile rubber with an AN value (content of acrylonitrile group in NBR) of 25 to 50 is preferable, and a nitrile rubber with an AN value of 30 to 45 is more preferable.

Furthermore, the solid rubber layer may contain a vulcanizing agent and a vulcanization accelerator. The vulcanizing agent is preferably contained in a large amount so as to increase a vulcanization density, and in the case of sulfur vulcanization, a sulfur compound amount is preferably 1.5 to 4.5 g (1.5 to 4.5 phr (parts per hundred rubber)) for 100 gram of polymer that is a rubber component.

Furthermore, as the vulcanization accelerator, it is preferable to use a vulcanization accelerator at a high rate with a time to T50 rising within 4 minutes according to curast data (150° C.).

In the disc brake shim according to the present invention, it is possible to form the solid rubber layer by, for example, dissolving a rubber compound containing a desired amount of polymer in an organic solvent to prepare a coating liquid, applying the coating liquid to an object to be coated such as the base material layer, and fixing the coating liquid.

The organic solvent is not limited as long as it can dissolve the above described rubber compound, but it is preferable to use an organic solvent prepared by mixing an ester solvent in a ratio of 10 to 90% by mass with respect to 10 to 90% by mass of aromatic hydrocarbon solvent (ketone type is also possible) such as toluene. Furthermore, as the coating liquid, a coating liquid that is prepared by dissolving the above described rubber compound in the above described organic solvent so that the solid content concentration is 10 to 60% by mass is preferable.

A coating method of the coating liquid containing the rubber compound is not particularly limited, but the coating liquid is preferably coated by a skimmer coater, a roll coater or the like that can control a coating thickness.

FIG. 2 is a vertical sectional view showing an exemplary mode of a disc brake shim S in which a solid rubber layer 20 is further laminated on a main surface on an opposite side from the foamed rubber layer 2, of the base material layer 1, in the exemplary mode shown in FIG. 1.

As shown in FIG. 2, in the present exemplary mode, the disc brake shim S is formed of a multilayered structure with four layers in which the solid rubber layer 20, the base material layer 1, the foamed rubber layer 2 and an adhesive layer "a" are sequentially laminated, and are fixed, and has the foamed rubber layer 2 as an intermediate layer between the base material layer 1 and the adhesive layer "a".

In the present exemplary mode, in a braking time, the disc brake shim S is also pressed (in a lower direction from an upper side in FIG. 2) by a pressing member such as a piston that is provided in a caliper, and it is also considered that not only the foamed rubber layer 2 forming the disc brake shim S hardly transmits vibration of the brake pad 3 and the like because the foamed rubber layer 2 has a low density with a foamed part, but also the foamed rubber layer 2 deforms to follow the vibration of the brake pad 3 and the like to easily convert the vibration into thermal energy because the foamed rubber layer 2 has flexibility, and the foamed rubber layer 2 can easily convert the vibration of the brake pad 3 and the like into frictional heat because the foamed rubber layer 2 further has a high friction coefficient.

The disc brake shim S according to the exemplary mode shown in FIG. 2 further has the solid rubber layer 20 and therefore, can suppress vibration and squeal more, as compared with the disc brake shim S according to the exemplary mode shown in FIG. 1.

The disc brake shim according to the present invention may have a plurality of base material layers each formed of a metal sheet.

The disc brake shim according to the present invention more easily improves vibration control performance as a constraint vibration control structure, by having the plurality of base material layers each formed of a metal sheet.

In this case, as the metal sheet forming the plurality of base material layers respectively, same metal sheet as the aforementioned metal sheet can be cited.

FIG. 3 is a vertical sectional view showing an exemplary mode of a disc brake shim S in which a base material layer 1 formed of a metal sheet is further laminated on the main surface on an opposite side from the foamed rubber layer 2, of the adhesive layer "a", in the exemplary mode shown in FIG. 2.

As shown in FIG. 3, in the present exemplary mode, the disc brake shim S is formed of a multilayer structure with five layers in which a solid rubber layer 20, an upper side base material layer 1 formed of a metal sheet, the foamed rubber layer 2, the adhesive layer "a" and a lower side base material layer 1 formed of a metal sheet are sequentially laminated in this order (in a lower direction from an upper part in FIG. 3), and are fixed, and has the foamed rubber layer 2 as an intermediate layer between the upper side base material layer 1 and the adhesive layer "a".

In the present exemplary mode, in a braking time, the disc brake shim S is also pressed (in the lower direction from an upper side in FIG. 3) by a pressing member such as a piston that is provided in a caliper, and it is also considered that not only the foamed rubber layer 2 forming the disc brake shim S hardly transmits vibration of a brake pad 3 and the like because the foamed rubber layer 2 has a low density with a foamed part, but also the foamed rubber layer 2 deforms to follow the vibration of the brake pad 3 and the like to easily convert the vibration into thermal energy because the foamed rubber layer 2 has flexibility.

The disc brake shim S according to the exemplary mode shown in FIG. 3 further has the base material layer 1, and therefore can suppress vibration and squeal more, as compared with the disc brake shim S according to the exemplary mode shown in FIG. 2.

FIG. 4 is a vertical sectional view of a disc brake shim S according to another mode of the present invention.

The disc brake shim S shown in FIG. 4 is formed of a multilayer structure with five layers in which an upper side base material layer 1 formed of a metal sheet, an adhesive layer "a", a foamed rubber layer 2, a lower side base material layer 1 formed of a metal sheet and a solid rubber layer 20 are sequentially laminated in this order (in a lower direction from an upper part in FIG. 4), and are fixed, and has the foamed rubber layer 2 as an intermediate layer between the lower side base material layer 1 and the adhesive layer "a".

In the present exemplary mode, in a braking time, the disc brake shim S is also pressed (in the lower direction from an upper side in FIG. 4) by a pressing member such as a piston that is provided in a caliper, and it is also considered that not only the foamed rubber layer 2 forming the disc brake shim S hardly transmits vibration of a brake pad 3 and the like because the foamed rubber layer 2 has a low density with a foamed part, but also the foamed rubber layer 2 deforms to follow the vibration of the brake pad 3 and the like to easily convert the vibration into thermal energy because the foamed rubber layer 2 has flexibility.

The disc brake shim S according to the exemplary mode shown in FIG. 4 further has the solid rubber layer 20 and the plurality of base material layers 1, and therefore can suppress vibration and squeal more, as compared with the disc brake shim S according to the exemplary mode shown in FIG. 1.

FIG. 5 is a vertical sectional view of a disc brake shim S according to another mode of the present invention.

The disc brake shim S shown in FIG. 5 is formed of a multilayer structure with six layers in which an upper side solid rubber layer 20, an upper side base material layer 1 formed of a metal sheet, an adhesive layer "a", a foamed rubber layer 2, a lower side base material layer 1 formed of a metal sheet and a lower side solid rubber layer 20 are sequentially laminated n this order (in a lower direction from an upper part in FIG. 5), and are fixed, and has the foamed rubber layer 2 as an intermediate layer between the lower side base material layer 1 and the adhesive layer "a".

In the present exemplary mode, in a braking time, the disc brake shim S is also pressed (in the lower direction from an upper side in FIG. 5) by a pressing member such as a piston that is provided in a caliper, and it is also considered that not only the foamed rubber layer 2 forming the disc brake shim S hardly transmits vibration of a brake pad 3 and the like because the foamed rubber layer 2 has a low density with a foamed part, but also the foamed rubber layer 2 deforms to follow the vibration of the brake pad 3 and the like to easily convert the vibration into thermal energy because the foamed rubber layer 2 has flexibility.

The disc brake shim S according to the exemplary mode shown in FIG. 5 further has the upper side solid rubber layer 20, and therefore can suppress vibration and squeal more, as compared with the disc brake shim S according to the exemplary mode shown in FIG. 4.

FIG. 6 is a vertical sectional view of a disc brake shim S according to another mode of the present invention.

The disc brake shim S shown in FIG. 6 is formed of a multilayer structure with six layers in which an upper side solid rubber layer 20, an upper side base material layer 1 formed of a metal sheet, a foamed rubber layer 2, an adhesive layer "a", a lower side base material layer 1 formed of a metal sheet and a lower side solid rubber layer 20 are sequentially laminated in this order (in a lower direction from an upper part in FIG. 6), and are fixed, and has the foamed rubber layer 2 as an intermediate layer between the upper side base material layer 1 and the adhesive layer "a".

In the present exemplary mode, in a braking time, the disc brake shim S is also pressed (in the lower direction from an upper side in FIG. 6) by a pressing member such as a piston that is provided in a caliper, and it is also considered that not only the foamed rubber layer 2 forming the disc brake shim S hardly transmits vibration of the brake pad 3 and the like because the foamed rubber layer 2 has a low density with a foamed part, but also the foamed rubber layer 2 deforms to follow the vibration of the brake pad 3 and the like to easily convert the vibration into thermal energy because the foamed rubber layer 2 has flexibility.

The disc brake shim S according to the exemplary mode shown in FIG. 6 further has the lower side solid rubber layer 20, and therefore can suppress vibration and squeal more, as compared with the disc brake shim S according to the exemplary mode shown in FIG. 3.

The disc brake shim according to the present invention may be a base shim or a cover shim, in a laminated shim in which the cover shim is laminated and disposed on the base shim.

For example, the disc brake shim according to the present invention may be a base shim BS or a cover shim CS in a laminated shim MS in which the cover shim CS is laminated on the base shim BS, in a vertical sectional view showing an outline of an exemplary mode of use of a disc brake shim according to the present invention illustrated in FIG. 7.

In this case, only either one of the base shim and the cover shim forming the laminated shim may be the disc brake shim according to the present invention, or both of the base shim and the cover shim that form the laminated shim may be the disc brake shim according to the present invention.

Note that in the present application documents, the base shim that forms the laminated shim means a shim that is attached on a pad material side at the time of arrangement, and the cover shim that forms the laminated shim means a shim that is disposed on a pressing member side at the time of arrangement. Furthermore, in the present application documents, the cover shim and the base shim means the cover shim and the base shim that are in a state in which entire joined surfaces of both of them are not chemically or physically fixed, but in a state in which they are adjacent disposed.

When only the base shim that forms the laminated shim is the disc brake shim according to the present invention, the structure of the cover shim can be properly selected from the conventionally known cover shims, and is not particularly limited.

For example, as illustrated in FIG. 8, a base shim BS that forms a laminated shim is the disc brake shim according to the present invention, and as a cover shim CS, a cover shim that is formed of a base material layer 1 formed of a metal sheet can be cited.

Furthermore, as illustrated in each of FIG. 9 and FIG. 10, a base shim BS that forms a laminated shim is the disc brake shim according to the present invention, and as a cover shim CS, a cover shim in which a solid rubber layer 20 is laminated and fixed onto a main surface on one side of a base material layer 1 formed of a metal sheet can be cited.

Furthermore, as illustrated in FIG. 11, a base system BS forming a laminated shim is the disc brake shim according to the present invention, and as a cover shim CS, it is possible to cite a cover shim in which solid rubber layers 20 and 20 are respectively laminated and fixed onto main surface on both sides of a base material layer 1 formed of a metal sheet.

As the base material layers formed of the metal sheets and the solid rubber layers of the above described cover shims, it is possible to cite the base material layer and the solid rubber layer that are same as described above respectively.

According to the present invention, it is considered that not only the foamed rubber layer provided on the base material layer hardly transmits vibration of a brake pad and the like because the foamed rubber layer has a low density with a foamed part, but also the foamed rubber layer deforms to follow vibration of the brake pad and the like to easily convert the vibration into thermal energy because the foamed rubber layer has flexibility, and the foamed rubber layer can easily convert vibration of the outer member into a frictional heat because the foamed rubber layer has a high friction coefficient.

Consequently, according to the present invention, it is possible to provide a novel disc brake shim that can effectively suppress vibration and squeal.

Next, a disc brake according to the present invention will be described.

The disc brake according to the present invention is a disc brake having pad materials disposed on both sides in an axial direction of a disc rotor, and shims that are adjacent disposed on opposite sides from the disc rotor, of the pad materials, wherein each of the shims is the disc brake shim according to the present invention.

As the disc rotor according to the present invention, a disc rotor having a mode as shown in FIG. 12 can be illustrated.

A disc brake B illustrated in FIG. 12 is a disc brake having brake pads 30 and 30 that are arranged on both sides in an axial direction of a disc rotor 60 that rotates integrally with a wheel, and shims S and S that are adjacent on opposite sides from the disc rotor 60, of the pad materials 30 and 30, and at least one of the above described shims S and S is the disc brake shim according to the present invention.

The disc brake B illustrated in FIG. 12 is structured such that it applies brakes by pressing the brake pads 30 and 30 that are arranged on both sides in the axial direction of the disc rotor 60 that rotates integrally with a wheel with a pressing member 70 formed of a piston and the like by hydraulic pressure of a brake oil 80 in a caliper 50, and pressing the brake pads 30 and 30 from both sides of the disc rotor 60.

In the disc brake according to the present invention, details of the disc brake shim are as described above.

Furthermore, in the disc brake according to the present invention, as specific examples of the other component members such as the disc rotor, and the brake pads, conventionally known component members can be cited, and the other component members are not particularly limited.

According to the present invention, it is considered that not only the foamed rubber layer forming the disc brake shim hardly transmits vibration of a brake pad and the like because the foamed rubber layer has a low density with a foamed part, but also the foamed rubber layer deforms to follow vibration of the brake pad and the like to easily convert the vibration into thermal energy because the foamed rubber layer has flexibility, and furthermore, the foamed rubber layer can easily convert vibration of the outer member into a frictional heat because the foamed rubber layer has a high friction coefficient.

Consequently, according to the present invention, it is possible to provide a novel disc brake that can effectively suppress vibration and squeal.

Next, the present invention will be described more specifically by citing examples, but these examples are only illustrations, and do not intend to restrict the present invention.

EXAMPLE 1

A rubber compound formed from components shown in Table 1, and compounded to have 50% by mass of a polymer, 25% by mass of a foaming agent, a total of 3% by mass of a vulcanizing agent and a vulcanization accelerator, and 22% by mass of a filler was dissolved in a mixed liquid of toluene and ethyl acetate (toluene:ethyl acetate=70:30 in a volume ratio) so as to have 40% by mass of a solid content concentration to prepare a coating liquid.

Subsequently, the above described coating liquid was applied onto the entire main surface on one side of the base material formed of a stainless steel sheet (SUS sheet) with a thickness of 0.5 mm to have a thickness of 125 μm by using a roll coater to fix and form an unfoamed rubber layer, and thereafter thermal treatment was applied thereto at 210° C. for 10 minutes, whereby a foamed rubber layer with a thickness of 100 μm was formed on the main surface on one side of the base material formed of an SUS sheet, and the laminated base material 1 was obtained.

A solid rubber (acrylonitrile butadiene rubber (NBR) system) layer was formed so as to have a thickness of 100 μm on the entire main surface on one side of the base material formed of a sheet material of a steel with a thickness of 0.4 mm, an adhesive layer was formed by coating to have a thickness of 100 μm on the main surface on the other side, and the laminated base material 2 was obtained.

By bonding the adhesive layer of the above described laminated base material 2 onto the foamed rubber layer of the above described laminated base material 1, a disc brake shim material was produced, which was formed of a multilayer structure with five layers in which the upper side base material layer formed of a steel sheet material, a foamed rubber layer, an adhesive layer, the lower side base material layer formed of a steel sheet material and the solid rubber layer were sequentially laminated and disposed in this order from the upper side to the lower side, and were fixed, and had the foamed rubber layer as an intermediate layer between the upper side base material layer and the adhesive layer.

The obtained disc brake shim material was provided for measurement of vibration dampening property evaluation as follows, as a test piece.
<Vibration Dampening Property Evaluation>

In the state in which the obtained disc brake shim material was set so that the solid rubber layer abuts on a support stand of a stainless steel sheet with a thickness of 5 mm of a loss coefficient measuring device (MS18143 made by Bruel & Kjar Sound & Vibration Measurement A/S), a loss coefficient η was measured under the conditions described below in conformity with the central exciting method (constrained steel sheet method) specified in JIS G0602.

Results are shown in Table 2 and FIG. 14.
Note that the higher the loss coefficient η, the higher the vibration dampening properties.
(Measurement Conditions)
Temperature range: −20° C. to 15° C.
Loss coefficient calculation method: antiresonance point half width method
Mode: secondary
Tightening torque: 4 N·m

COMPARATIVE EXAMPLE 1

A rubber compound formed from the components shown in Table 1, and compounded to contain 40% by mass of a polymer, a total of 3% by mass of a vulcanizing agent and a vulcanization accelerator, and 57% by mass of a filler was dissolved in a mixed liquid of toluene and ethyl acetate (toluene:ethyl acetate=70:30 in a volume ratio) so as to have 40% by mass of a solid content concentration to prepare a coating liquid.

Subsequently, the above described coating liquid was applied onto the entire main surface on one side of the base material formed of a stainless steel sheet (SUS sheet) with a thickness of 0.5 mm to have a thickness of 250 μm by using a roll coater, and thereafter, thermal treatment was applied at 200° C. for 10 minutes, whereby a solid rubber layer with a thickness of 100 μm was formed on the main surface on one side of the base material formed of an SUS sheet, and the laminated base material 1 was obtained.

A solid rubber (acrylonitrile butadiene rubber (NBR) system) layer was formed so as to have a thickness of 100 μm on the entire main surface on one side of the base material formed of a sheet material of a steel with a thickness of 0.4 mm, an adhesive layer was formed by coating to have a thickness of 100 μm on the main surface on the other side, and the laminated base material 2 was obtained.

By bonding the adhesive layer of the above described laminated base material 2 onto the solid rubber layer of the above described laminated base material 1, a disc brake shim material was produced, which was formed of a multilayer structure with five layers in which the upper side base material layer formed of a steel sheet material, the upper side solid rubber layer, the adhesive layer, the lower side base material layer formed of a steel sheet material and the lower side solid rubber layer are sequentially laminated and disposed in this order from the upper side to the lower side, and are fixed, and had the solid rubber layer as an intermediate layer between the upper side base material layer and the adhesive layer.

The obtained disc brake shim material was provided for the following vibration dampening property evaluation, as a test piece.
<Vibration Dampening Property Evaluation>

A loss coefficient η was measured under the same conditions as in example 1, except that the obtained disc brake shim material was oriented so that the lower side solid rubber layer abuts on the support stand of a stainless steel sheet with a thickness of 5 mm of the loss coefficient measuring device (MS18143 made by Bruel & Kjar Sound & Vibration Measurement A/S).

Results are shown in Table 2 and FIG. 14.

TABLE 1

| | Rubber compound component | | | | | Rubber layer thickness (μm) | | Rubber layer thickness (μm) | |
|---|---|---|---|---|---|---|---|---|---|
| | Polymer (rubber component) | | | Vulcanizing | Vulcanization | (before | Expansion | (after | Continuous foam rate |
| | Type | AN value | Mooney value | Foaming agent | agent | accelerator | heating) | ratio | heating) | (%) |
| Example 1 | Acrylonitrile butadiene rubber (NBR) | 33 | 50 | Heat-decomposable (azodicarbonamide system) | Sulfur | Sulfenamide system | 50 | 2 | 100 | 100 |
| Comparative example 1 | Acrylonitrile butadiene rubber (NBR) | 43 | 80 | — | Sulfur | Thiazole system | 100 | — | 100 | — |

TABLE 2

| Temperature (° C.) | Comparative example 1 Loss coefficient η (−) | Example 1 Loss coefficient η (−) |
|---|---|---|
| −20 | 0.0036 | 0.0045 |
| −15 | 0.0055 | 0.0080 |
| −10 | 0.0093 | 0.0169 |
| −5 | 0.0179 | 0.0383 |
| 0 | 0.0374 | 0.0852 |
| 5 | 0.0758 | 0.1590 |
| 10 | 0.1606 | 0.2490 |
| 15 | 0.2827 | 0.3254 |

EXAMPLE 2 TO EXAMPLE 4

The disc brake shim materials were obtained, each of which was formed of a multilayer structure with five layers in which the upper side base material layer formed of a steel sheet material, the foamed rubber layer, the adhesive layer, the lower side base material layer formed of a steel sheet material and a solid rubber layer were sequentially laminated in this other from the upper side to the lower side, and were fixed, and had the foamed rubber layer as an intermediate layer between the upper side base material layer and the adhesive layer, in the same way as in example 1, except that the content ratios of the foaming agents in the coating liquids were respectively changed to 10% by mass, and thereafter, the stainless steel sheet (SUS sheet) with a thickness of 0.5 mm was changed to a cold-rolled steel sheet (SPCC) with a thickness of 0.4 mm (example 2), was changed to a cold-rolled steel sheet (SPCC) with a thickness of 0.6 mm (example 3), and was changed to a cold-rolled steel sheet with a thickness of 0.8 mm (example 4), in example 1.

The obtained disc brake shim materials were provided for the vibration dampening property evaluation in the same way as in example 1, as the test pieces, and peak values (maximum values) of the loss coefficients η were obtained.

As a result, the peak values (maximum values) of the loss coefficients η were respectively 0.0240 (example 2), 0.0390 (example 3), and 0.0570 (example 4).

EXAMPLE 5 AND EXAMPLE 6

The disc brake shim materials were obtained, each of which was formed of a multilayer structure with five layers in which the upper side base material layer formed of a steel sheet material, the foamed rubber layer, the adhesive layer, the lower side base material layer formed of a steel sheet material and the solid rubber layer were sequentially laminated in this other from the upper side to the lower side, and were fixed, and had the foamed rubber layer as an intermediate layer between the upper side base material layer and the adhesive layer, in the same way as in example 1, except that the content ratios of the foaming agents in the coating liquids were respectively changed to 10% by mass, and thereafter, the SUS sheet with a thickness of 0.5 mm was changed to a hot-dip zinc-coated steel sheet (SGCH) with a thickness of 0.4 mm (example 5), and was changed to a stainless steel sheet (SUS 301) with a thickness of 0.4 mm (example 6), in example 1.

The obtained disc brake shim materials were provided for the vibration dampening property evaluation in the same way as in example 1, as the test pieces, and peak values (maximum values) of the loss coefficients η were obtained.

As a result, the peak values (maximum values) of the loss coefficients η were respectively 0.0270 (example 5), and 0.0330 (example 6).

Results of example 2 to example 6 are shown in Table 3.

TABLE 3

| | Steel sheet type | Steel sheet thickness (mm) | Peak value of loss coefficient η(−) |
|---|---|---|---|
| Example 2 | Cold-rolled steel sheet | 0.4 | 0.0240 |
| Example 3 | Cold-rolled steel sheet | 0.6 | 0.0390 |
| Example 4 | Cold-rolled steel sheet | 0.8 | 0.0570 |
| Example 5 | Hot-dip zinc-coated steel sheet | 0.4 | 0.0270 |
| Example 6 | Stainless steel sheet (SUS301) | 0.4 | 0.0330 |

EXAMPLE 7 TO EXAMPLE 9

The disc brake shim materials were obtained, each of which was formed of a multilayer structure with five layers in which the upper side base material layer formed of a steel sheet material, the foamed rubber layer, the adhesive layer, the lower side base material layer formed of a steel sheet material and the solid rubber layer were sequentially laminated in this order from the upper side to the lower side, and were fixed, and had the foamed rubber layer as an intermediate layer between the upper side base material layer and the adhesive layer, in the same way as in example 1, except that after the content ratios of the foaming agents in the coating liquids were respectively changed to 10% by mass, and the stainless steel sheet (SUS sheet) with a thickness of 0.5 mm was changed to a cold-rolled steel sheet (SPCC) with a thickness of 0.4 mm, the foamed rubber layer with a thickness of 30 μm was obtained by thermally treating the unfoamed rubber layer with a thickness of 15 μm (example 7), the foamed rubber layer with a thickness of 100 μm was obtained by thermally treating the unfoamed rubber layer with a thickness of 50 μm (example 8), and the foamed rubber layer with a thickness of 200 μm was obtained by thermally treating the unfoamed rubber layer with a thickness of 100 μm (example 9), in example 1.

The obtained respective disc brake shim materials were provided for the vibration dampening property evaluation in the same way as in example 1, as the test pieces, and peak values (maximum values) of the loss coefficients η were obtained.

As a result, the peak values (maximum values) of the loss coefficients η were respectively 0.0330 (example 7), 0.0240 (example 8), and 0.0210 (example 9).

EXAMPLE 10 AND EXAMPLE 11

The disc brake shim materials were obtained, each of which was formed of the multilayer structure with five layers in which the upper side base material layer formed of a steel sheet material, the foamed rubber layer, the adhesive layer, the lower side base material layer formed of a steel sheet material and the solid rubber layer were sequentially laminated in this order from the upper side to the lower side, and were fixed, and had the foamed rubber layer as an intermediate layer between the upper side base material layer and the adhesive layer, in the same way as in example 1, except that after the stainless steel sheet (SUS sheet) with a thickness of 0.5 mm was changed to a cold-rolled steel sheet (SPCC) with a thickness of 0.4 mm, the content ratio of the foaming agent in the coating liquid was changed to 20% by mass (example 10), and the content ratio of the foaming agent in the coating liquid was changed to 30% by mass (example 11) in example 1.

The obtained disc brake shim materials were provided for the vibration dampening property evaluation in the same way as in example 1, as the test pieces, and peak values (maximum values) of the loss coefficients η were obtained.

As a result, the peak values (maximum values) of the loss coefficients η were respectively 0.0400 (example 10), and 0.0330 (example 11).

Results of example 7 to example 11 are shown in Table 4.

According to the results of example 1 to example 11, it is found that the disc brake shim according to the present invention is formed of a multilayer structure with three layers or more having the base material layer formed of a metal sheet, and the foamed rubber layer that is laminated on the main surface on one side of the base material layer, wherein the above described foamed rubber layer is the intermediate layer in the above described multilayer structure, and thereby in the range of all temperatures of measurement, the loss coefficients are high (example 1 and example 2) or the peak values of the loss coefficients are 0.0200 or more which are high (example 3 to example 12), so that the disc brake shim of the present invention exhibits excellent braking performance under these temperatures, and can favorably suppress occurrence of squeal.

In contrast to the above, according to the results of comparative example 1, it is found that in the disc brake shim having the solid rubber layer instead of the foamed rubber layer, the loss coefficients are low in the range of all the temperatures of measurement, so that under these temperatures, the disc brake shim is inferior in braking performance, and cannot suppress occurrence of squeal.

INDUSTRIAL APPLICABILITY

According to the present invention, it is possible to provide a novel disc brake shim and disc brake that can effectively suppress vibration and squeal.

REFERENCE SIGNS LIST 1 base material layer
2 foamed rubber layer
3 brake pad
4 back metal
10 base material layer
20 solid rubber layer
30 brake pad
40 back metal
50 caliper
60 disc rotor
70 pressing member
80 brake oil
a adhesive layer
S disc brake shim
P pad material
MS laminated shim
CS cover shim
BS base shim

TABLE 4

| | Steel sheet type | Steel sheet thickness (mm) | Foamed rubber layer thickness (mm) | Foaming agent content ratio in coating liquid (% by mass) | Peak value of loss coefficient η(–) |
|---|---|---|---|---|---|
| Example 7 | Cold-rolled steel sheet | 0.4 | 30 | 10 | 0.0330 |
| Example 8 | Cold-rolled steel sheet | 0.4 | 100 | 10 | 0.0240 |
| Example 9 | Cold-rolled steel sheet | 0.4 | 200 | 10 | 0.0210 |
| Example 10 | Cold-rolled steel sheet | 0.4 | 100 | 20 | 0.0400 |
| Example 11 | Cold-rolled steel sheet | 0.4 | 100 | 30 | 0.0330 |

The invention claimed is:

1. A disc brake shim that is formed of a multilayer structure with three layers or more, the disc brake shim comprising:
    a first base material layer formed of a metal sheet;
    a second base material layer formed of a metal sheet;
    a foamed rubber layer that is laminated on at least a part of a main surface on a first side of either of the first and second base material layers; and
    an adhesive layer that is laminated on a second side of the other of the first and second base material layers so that the foamed rubber layer and the adhesive layer are sandwiched between the first and second base material layers.

2. The disc brake according to claim 1, further comprising a solid rubber layer that is laminated on an outer side of the multilayer structure.

3. The disc brake shim according to claim 1, wherein the foamed rubber layer is a foam of an unfoamed rubber having a thickness of 15 to 100 µm with an expansion ratio of 2 to 4 times.

4. The disc brake shim according to claim 1, wherein the continuous foam rate of the foamed rubber layer is greater than 60%.

5. The disc brake shim according to claim 1, wherein the continuous foam rate of the foamed rubber layer is 100%.

6. A disc brake comprising:
    pad materials on both sides in a axial direction of a disc rotor; and
    shims on opposite sides from the disc rotor adjacent to the pad materials,
    wherein each of the shims is the disc brake shim according to claim 1.

* * * * *